(12) United States Patent
Rettig (10) Patent No.: US 6,264,538 B1
(45) Date of Patent: *Jul. 24, 2001

(54) EDGE-FINISHING MACHINE (75) Inventor: Karl Rettig, Indianapolis, IN (US)

(73) Assignee: Industrial Tool Works, Inc., Indianapolis, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,677

(22) Filed: Oct. 9, 1998

Related U.S. Application Data (60) Provisional application No. 60/102,985, filed on Oct. 2, 1998.

(51) Int. Cl.$^7$ ......................................................... B24B 9/00
(52) U.S. Cl. .......................... 451/184; 451/44; 451/120; 451/158; 451/178
(58) Field of Search .............................. 451/44, 120, 158, 451/178, 182, 183, 184, 260, 300, 302

(56) References Cited

U.S. PATENT DOCUMENTS

| | | |
|---|---|---|
| Re. 29,097 | 1/1977 | Bando ..................................... 51/110 |
| 3,136,094 | 6/1964 | Reaser . |

(List continued on next page.)

*Primary Examiner*—Timothy V. Eley
*Assistant Examiner*—Willie Berry, Jr.

(74) *Attorney, Agent, or Firm*—Covington & Burling (57) ABSTRACT

This invention provides an improved machine for finishing the edges of glass or other brittle materials. The machine is distinguished by its few moving parts, and its ease of maintenance. The edge-finishing machine includes a main conveyor section including two toothed main belts that grip and convey the glass or other material to be finished past grinding or polishing wheels, or other means for finishing the edges of the material. These main conveyor belts are synchronously driven, each by a separate motor or other power transmission unit. The main conveyor section of the machine also includes means to tension the main belts, preferably including non-rotating returns made from durable, low-friction material such as ultra-high molecular weight plastic. The edge-finishing machine may also include an infeed conveyor section, adjacent to the main conveyor section, including a toothed infeed belt, means for driving the infeed belt, infeed belt tensioning means, and means for adjusting the speed of the infeed belt relative to the speed of the main conveyor belts. The present invention may also include an outfeed conveyor belt, on the other side of the machine from the infeed conveyor section, and constructed and operating similarly to the infeed conveyor section. The edge-finishing machine may also include means for distributing coolant toward the grinding wheels or other edge finishing means. The coolant-distributing means may include a substantially clear cover for the coolant distribution space, and a coolant manifold pipe connected to at least one nozzle for distributing coolant. Preferably, a flexible tube connects the manifold pipe with each nozzle so that the direction of the coolant spray can be adjusted as needed.

21 Claims, 3 Drawing Sheets

U.S. PATENT DOCUMENTS

| | | | |
|---|---|---|---|
| 3,728,830 | 4/1973 | Maca | 51/283 |
| 3,841,087 | 10/1974 | Bando | 51/110 |
| 3,882,995 | 5/1975 | Uraya . | |
| 3,918,574 | 11/1975 | Allison | 198/203 |
| 4,079,551 | 3/1978 | Bando | 51/110 |
| 4,206,994 | 6/1980 | Silverberg et al. . | |
| 4,364,696 | 12/1982 | Syarto | 409/183 |
| 4,493,233 | 1/1985 | Dusel | 83/71 |
| 4,660,327 | 4/1987 | Bando | 51/110 |
| 4,698,088 | 10/1997 | Bando | 65/174 |
| 4,739,590 | 4/1988 | Myers | 51/283 E |
| 4,843,764 | 7/1989 | Bando | 51/110 |
| 5,056,272 * | 10/1991 | Battaglia . | |
| 5,146,715 | 9/1992 | Bando | 51/165.77 |
| 5,164,777 | 11/1992 | Agarwal et al. . | |
| 5,184,430 | 2/1993 | Bavelloni | 51/215 E |
| 5,261,527 | 11/1993 | Krismanth | 198/833 |
| 5,313,743 | 5/1994 | Peschik | 51/266 |
| 5,331,769 | 7/1994 | Walton | 51/105 SP |
| 5,409,416 * | 4/1995 | Eichhorn et al. . | |
| 5,496,206 * | 3/1996 | Young . | |
| 5,964,264 | 9/1999 | Eltvedt . | |

* cited by examiner

EDGE-FINISHING MACHINE

This application claims benefit of U.S. Provisional Application No. 60/102,985 filed Oct. 2, 1998.

BACKGROUND OF THE INVENTION

This invention relates to a machine for working the edge of a solid material. More specifically, the invention provides an improved machine for grinding or polishing the edge of glass or other brittle material.

DESCRIPTION OF THE RELEVANT ART

Finishing the edge of a piece of glass or similarly brittle materials presents several difficulties. For example, the hardness of the material requires advanced cutting or grinding media, such as wheels impregnated with diamonds, to perform the grinding or polishing. At the same time, the slightest vibration of the workpiece or of a grinding wheel may cause scratches or other marks in the workpiece, potentially rendering the product unsuitable for commercial use. Moreover, due to the brittle nature of glass or similar material, excessive vibrations or uncontrolled motions of either the workpiece or a grinding wheel will cause the workpiece to chip or break. A further difficulty arises because of the heat generated during the grinding or polishing of the hard material. Without cooling, the heat generated by the grinding process, in combination with the brittle nature and thermal expansion properties of the workpiece, would cause the workpiece to break. To meet this difficulty, the workpiece is typically flooded with coolant while it is being ground or polished.

The difficulties in finishing the edges of glass and other brittle materials have given rise to a variety of different approaches and machines. In some machines, the glass has been held fixed while the grinding wheels and other portions of the machine have moved. In currently preferred machines, however, the greater mass (i.e., the machine) remains stationary while the workpiece is conveyed past the grinding wheels. In some of these machines, the workpiece moves in a horizontal plane. In the more commonly used commercial edging machines, the workpiece moves in an essentially vertical plane. This essentially vertical alignment of the workpiece uses the force of gravity to hold the workpiece against a grinding reference plane, eliminating the potential need to support a large workpiece in a horizontal plane as its edges are ground or polished, and reduces the floor area required by the machine.

Because of the many challenges presented, the design of current edge finishing machines has focused on the task to be accomplished, that is, producing a commercially acceptable edge finish at reasonable production speeds. To accomplish the precise mechanical motions required to finish an edge of the workpiece, the typical machine includes scores if not hundreds of moving parts, including gears, chains, pins and bearings. Failure of any of these parts degrades the quality of the finish and decreases the speed of the machine. In many cases, failure of a single part brings production to a complete halt. In addition, many of the parts in a typical edge-finishing machine are in continual contact with the coolant required in the grinding process, which in turn causes rust or premature failure of the parts. These problems are exacerbated by the fine particles produced in the grinding process—commonly referred to as "swarf"—which quickly coat machine surfaces and work their way into the moving parts, again causing premature failure.

To appreciate the contributions of the machine of the present invention, the basic sections of a typical edge-finishing machine are described in further detail, together with the difficulties and challenges they present. These basic sections can be identified as the main conveyor section; the edge finishing section, typically comprising grinding and polishing wheels and spindles; the infeed and outfeed sections; and the coolant section.

The main conveyor section is often considered the heart of an edge-finishing machine. It must support the entire weight of the workpiece. The main conveyor section must also hold the workpiece with near-perfect alignment with the grinding or polishing wheels while at the same time conveying the workpiece past those wheels at a uniform speed. Typically, the main conveyor section includes a front conveyor belt and a back conveyor belt, with some means of moving the front and back belts toward or away from each other in order to "clamp" the workpiece with proper gripping pressure on the glass. As described above, even slight vibration or improper movement of the workpiece while it is being ground or polished will likely result in a manufacturing defect or breakage of the workpiece.

To meet these mechanical requirements, edge-finishing machines have typically employed several methods. For example, in some machines, both the front and the back conveyor belts are composed of numerous elements, generally metallic, with each element usually separately covered with an elastomeric material such as rubber to provide a pad or gripping surface. Each element in the front or back conveyor belt is linked to a similar adjoining element by means of a pin or a similar connecting device, forming a continuous chain or belt. The construction of the pads and elements of the front conveyor may differ markedly from the back conveyor, or the front and back belts may be identically constructed. The conveyor pad elements may ride against a fixed surface, with metal-to-metal sliding contact, or bearings may be used in one form or another to achieve rolling rather than sliding friction. Virtually all of the designs for the main conveyor section of edge finishing machines involve a large number of individual parts and elements, such as pins, bearings, rollers and the like, which are subject to wear and breakage and consequent problems in production efficiency or product quality.

The edge finishing section of a typical machine includes grinding or polishing wheels or spindles. These typically perform their function by spinning in contact with the workpiece while it is conveyed past them by the main conveyor. Once again many methods have been utilized in the past. In some cases each wheel is mounted directly onto the end of an electric motor. Other commercial edging machines have utilized separate spindles driven by electric motors by means of one or more rubber belts. Each of these designs, however, involves relatively complex systems to drive the polishing wheels or spindles, and therefore presents a substantial risk of failure of one of the components, especially in the hostile environment of cooling fluid and swarf.

The infeed section of the typical edge-finishing machine moves the workpiece into the main conveyor section at the proper speed and alignment. This is frequently achieved by supporting the workpiece on a belt or chain on which supporting pads are mounted. The infeed belt or padded chain is typically driven by a series of shafts and gear boxes, chains and sprockets or similar driving schemes, often powered by the same source that powers the main conveyor section. This direct mechanical coupling insures that the infeed speed of the glass sheets matches the speed of the main conveyor section. The outfeed section, which pulls the finished workpiece away from the main conveyor section, generally mirrors the infeed system, with a similar complex mechanical drive system. A main difficulty of such infeed and outfeed systems is that they contain numerous mechanical parts, such as chains, sprockets, gears and the like, any one of which can fail, particularly in the hostile environment of coolant and glass swarf. Moreover, in typical edge-finishing machines, these drive mechanisms are housed in enclosures that make them difficult to see without specifically opening, the enclosure, which may entail stopping the machine. As a consequence, inspections to avoid failures are difficult. In addition, the parts of the driving systems are often tedious to replace, prolonging machine down-time and leading to higher maintenance costs.

The coolant section of the typical edge-finishing machine includes pumps, piping, nozzles, tanks, collection systems and other components needed to direct coolant onto the grinding wheels and the workpiece. In general, coolant systems of typical edge-finishing machines are difficult to maintain. If piping, tubes or other passages become clogged with swarf or other debris, hours of work may be needed to dismantle the machine to find and clear the blocked passages. Because the coolant system is generally so difficult to observe, serious lack of coolant flow often goes undetected, resulting in damaged grinding wheels and lower quality production.

As a general matter, in the design of edge finishing machines, ease of maintenance and trouble-free operation have been secondary considerations. Correspondingly, little provision typically has been made for what happens when one of the many parts of the machine fails. To replace some parts, which may cost only a few dollars, many hours of tedious disassembly may be required. Production time is lost, hours of maintenance labor must be expended and production workers are idled. In the process of disassembling and reassembling the complex machine, technicians may make errors or damage parts that result in still further losses of productivity.

SUMMARY OF THE INVENTION

An object of the invention is to provide an improved machine for finishing the edges of glass or other brittle material.

A further object of the invention is to reduce the complexity and the number of parts in a machine for finishing the edges of glass or other brittle material.

Another object of the invention is to provide a novel main conveyor section for a machine for finishing the edges of glass or other brittle material. More specifically, it is an object of the invention to provide main conveyor belts of an edge-finishing machine that are driven synchronously, either by a single motor, or by separate motors that are electronically connected.

An additional object of the invention is to provide an infeed conveyor section of a machine for finishing the edges of glass or other brittle material, where the infeed conveyor section includes an infeed belt driven at an adjustable speed relative to the speed of the main conveyor belts of the machine.

A further object of the invention is to provide an outfeed conveyor section of a machine for finishing the edges of glass or other brittle material, where the outfeed conveyor section includes an outfeed belt driven at an adjustable speed relative to the speed of the main conveyor belts of the machine.

An additional object of the invention is to provide a simplified cooling section for a machine for finishing the edges of glass or other brittle material.

The present invention, as broadly described herein, provides a machine for finishing the edges of glass or other materials, comprising a main conveyor section that includes two toothed main belts that are driven synchronously by toothed pulleys, with each toothed pulley driven by a separate power transmission unit; means for tensioning the main belts; and means for finishing the edge of the workpiece.

The present invention, as broadly described, may also include an infeed conveyor section for feeding a workpiece to the main conveyor section, with the infeed conveyor section including a toothed infeed belt, means for driving the infeed belt, means for adjusting the speed of the infeed belt relative to the speed of the main conveyor belts, and means for tensioning the infeed belt.

The present invention, as broadly described, may include an outfeed conveyor section for feeding a workpiece from the main conveyor section, with the outfeed conveyor section including a toothed outfeed belt, means for driving the outfeed belt, means for adjusting the speed of the outfeed belt relative to the speed of the main conveyor belts, and means for tensioning the outfeed belt.

The present invention, as broadly described, may further include cooling means for a machine for finishing the edges of glass or other materials, with the cooling system providing a confined space, a coolant manifold pipe, and at least one nozzle for directing coolant at the edge finishing means.

Additional objects and advantages of the invention are set forth in part in the description which follows, and in part are obvious from the description, or may be learned by practice of the invention. The objects and advantages of the invention may also be realized and attained by means of the instrumentalities and combinations particularly pointed out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF PREFERRED EMBODIMENTS

Reference will now be made in detail to the present preferred embodiments of the invention, examples of which are illustrated in the accompanying drawings, where like reference numerals indicate like elements throughout the several views.

Figure 1:
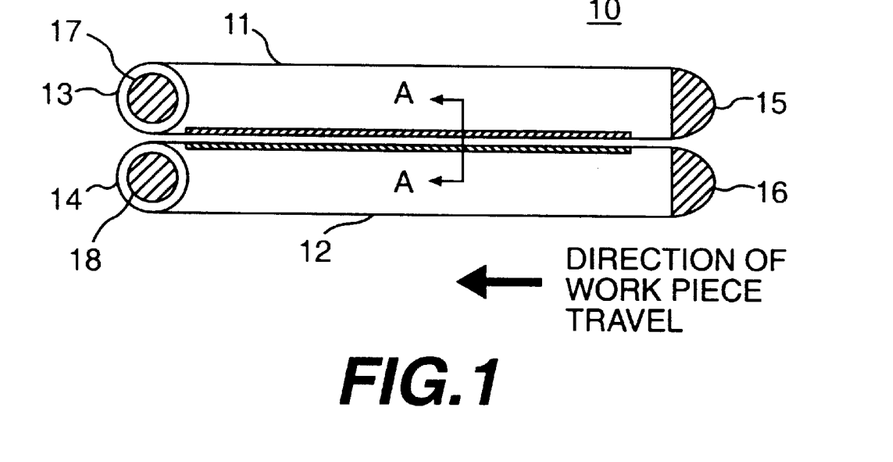
FIG. 1 provides a top-down overview of the main conveyor section of a preferred embodiment of the edge-finishing machine of the present invention.

The edge-finishing machine of the present invention comprises a main conveyor section including two toothed belts that are synchronously driven by toothed pulleys wherein each toothed pulley is driven by a separate power transmission unit; means for tensioning the toothed belts; and means for edge finishing. FIG. 1 depicts a preferred embodiment of the main conveyor section 10 of the edge-finishing machine of the present invention. As depicted in FIG. 1, the main conveyor section 10 comprises a pair of toothed flexible belts 11 and 12, driven by toothed pulleys 13 and 14. The belts and pulleys are constructed and aligned so that the teeth of each belt engage the teeth of its corresponding pulley assure that the belts 11 and 12 cannot slip under load. As depicted in FIG. 1, each of toothed pulleys 13 and 14 is driven by a separate power transmission unit 17 and 18, respectively.

Figure 3:
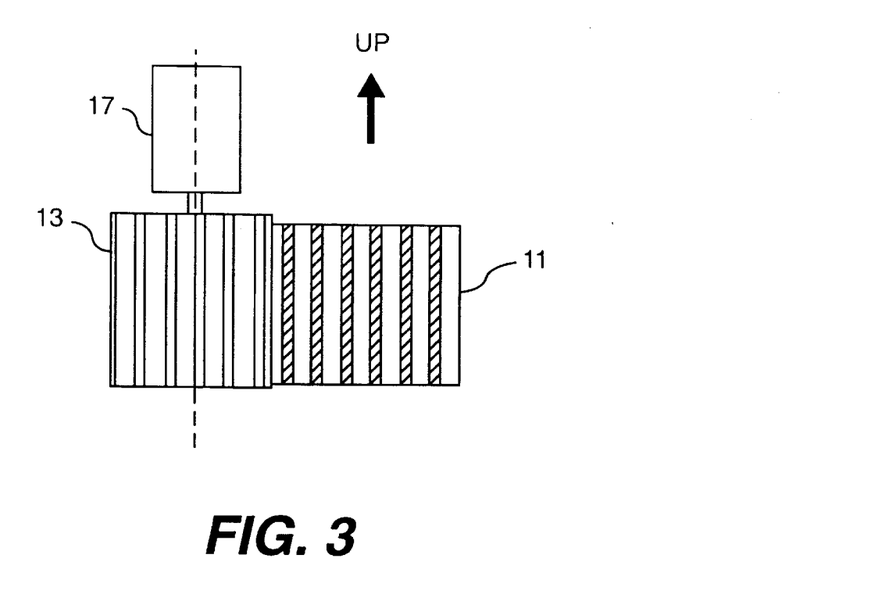
FIG. 3 provides a sectional elevation view of a preferred embodiment of a toothed belt of the edge-finishing machine of the present invention.

The belts 11 and 12 are driven synchronously by the toothed pulleys 13 and 14 so that the belts 11 and 12 move in substantially perfect synchronization with each other. In preferred embodiments, one of the power transmission units utilizes an AC inverter motor. In other preferred embodiments, one of the power transmission units is a direct current drive motor, or one of the motors is a stepping motor. Other types of power transmission units for driving the toothed pulleys will be apparent to those of skilled in the art. Preferably in order to help assure synchronized operation of the belts 11 and 12, power transmission units 17 and 18 are matched. As depicted in FIG. 1, power transmission units 17 and 18 preferably are mounted above the toothed pulleys 11 and 12 and the main belts 11 and 12, which positions these units 17 and 18 above both the edge finishing means and the flow of coolant, thereby reducing the risk of failure of the driving motors due to moisture or swarf. This configuration is also depicted in FIG. 3, showing a preferred embodiment of belt 11, toothed pulley 13 and power transmission unit 17.

In a preferred embodiment the separate power transmission units 17 and 18 are electronically connected to each other, thereby eliminating the need for connecting gears or other physical mechanisms for attempting to synchronize the units. In another preferred embodiment, the power transmission units 17 and 18 are electronically connected to each other by means of an alternating current inverter for regulating motor speeds. Other means for connecting the power transmission units 17 and 18 to each other, so that the belts 11 and 12 move in substantially perfect synchronization with each other, will also be apparent to those skilled in the art.

In a preferred embodiment, each of toothed belts 11 and 12 is an endless elastomeric belt. For example, toothed belts may be made from extremely durable material, such as the belts that have been used for purposes such as providing traction for "bobcat" earth moving machines. In a preferred embodiment, belts 11 and 12 are made from rubber, and may be reinforced.

In the preferred embodiment depicted in FIG. 1, the main belt tensioning means of the main conveyor section 10 of the edge-finishing machine of the present invention comprises non-rotating returns 15 and 16. As depicted in FIG. 1, return 15 provides tensioning for main belt 11, and return 16 provides tensioning for main belt 12. This aspect of the invention eliminates the need for idler pulleys, for example, to provide tension for the main conveyor belts. In a preferred embodiment, belts 11 and 12 simply slide around returns 15 and 16, respectively, thus reducing both the number of moving parts and wear and tear. In a preferred embodiment depicted in FIG. 1, returns 15 and 16 are semicircular. In alternate preferred embodiments, returns 15 and 16 may form arcuate, elliptical or other paths for returning main belts 11 and 12 under proper tension. In a preferred embodiment, returns 15 and 16 are formed from ultra-high molecular weight plastic, acetyl, nylon, PTFE or any other durable, low-friction material adequate to provide tensioning for main belts 11 and 12, as will be apparent to those of skill in the art. In a preferred embodiment, the distance between toothed pulley 13 and return 15 is adjustable to permit adjustment of the tension of belt 11. In a preferred embodiment, the distance between toothed pulley 14 and return 16 is similarly adjustable.

A benefit of this aspect of the invention is that the main belt tensioning means, preferably embodied in returns 15 and 16, can be precisely aligned during assembly of the edge-finishing machine, thus helping to assure proper alignment of the belts 11 and 12 on their return path. If bearing mounted pulleys were used, in contrast, they would have to be aligned by a set-up technician after the machine was delivered to the user; otherwise the belts would tend to "track" off-line. This off-line tracking action can actually lift the workpiece off-plane causing defects or possible breakage.

Figure 2:
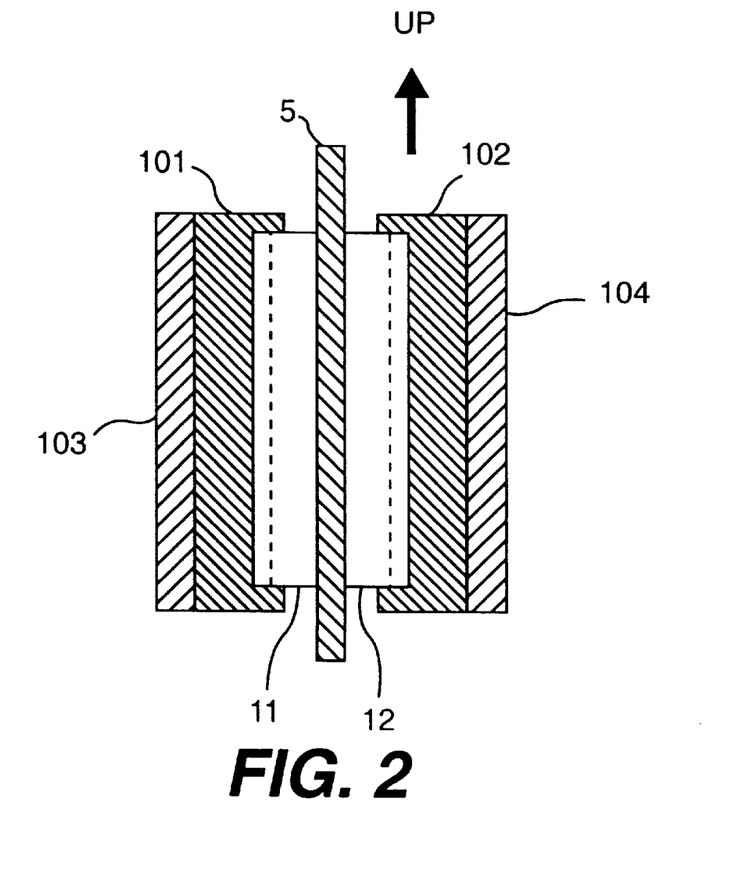
FIG. 2 provides a cutaway detail view of the main conveyor section of a preferred embodiment of the edge-finishing machine of the present invention.

FIG. 2 depicts a detailed view of part of a preferred embodiment of the main conveyor section of the edge-finishing machine of the present invention, taken as cutaway A—A from FIG. 1, and showing the main belt tracks that guide each of belts 11 and 12. As depicted in FIG. 2, workpiece 5 is conveyed by toothed main belts 11 and 12. In the preferred embodiment depicted in FIG. 2, belt 11 is aligned against and guided by a main belt track comprised of stationary backing strip 101, and belt 12 is aligned against and guided by a main belt track comprised of stationary backing strip 102. As depicted in FIG. 2, stationary backing strips 101 and 102 form a recessed track for each of main belts 11 and 12, respectively, as they grip workpicce 5, and thus maintain the vertical alignment of belts 11 and 12 as the belts, gripping workpiece 5, travel through the main conveyor section. Stationary backing strips 101 and 102 preferably are made from a durable, low friction material, such as ultra-high molecular weight plastic, acetyl, nylon, PTFE or similar material as may be known in the art. The use of such materials obviates the need for grease or other lubricants that would be needed if the backing strips were made of metal.

As further depicted in FIG. 2, in a preferred embodiment, stationary backing strips 101 and 102 are mounted, respectively, on stationary backing plates 103 and 104. In order to provide the appropriate pressure against main belts 11 and 12 for gripping workpiece 5, in a preferred embodiment the distance between the assembly of stationary backing strip 101 and stationary backing plate 103, on the one hand, and the assembly of stationary backing strip 102 and stationary backing plate 104, on the other hand, may be adjusted. Techniques for providing this adjustment include use of mechanical dovetail slides and other adjustment mechanisms and systems as will be apparent to those of skill in the art.

Figure 5:
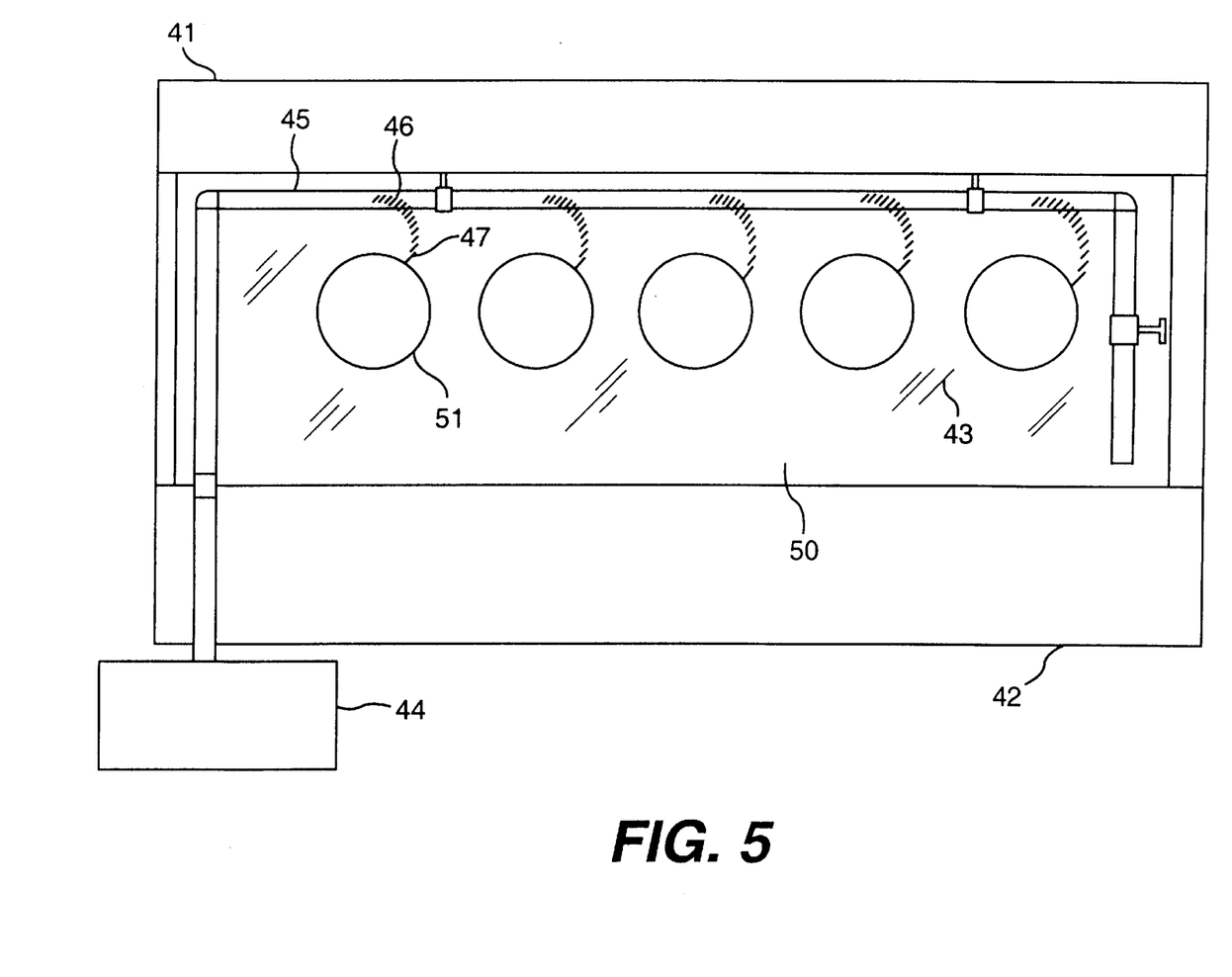
FIG. 5 provides an elevation view of a preferred embodiment of the coolant section of the edge-finishing machine of the present invention.

The means for edge finishing of the edge-finishing machine of the present invention preferably comprise grinding or polishing wheels or the like, as is apparent to those of skill in the art. FIG. 5 depicts a preferred embodiment of an edge-finishing machine of the present invention including five grinding wheels 51. In a preferred embodiment, the grinding wheels 51 are mounted in such a position as to grind the correct amount of material off of the bottom edge of the workpiece 5 as the workpiece 5 travels through the main conveyor section.

As discussed above, the use of belts, chains and other complex mechanical drives for the grinding and polishing wheels are to be avoided since such mechanisms can be subject to early failure, particularly since they must be mounted very near to the cooling fluid and the production of swarf. Mounting the grinding or polishing wheels directly onto the ends of electric motors is also not recommended since the motor shaft would be subjected to high tangential forces created when grinding occurs, leading to premature bearing failure in the motors.

Accordingly, in a preferred embodiment and as known in the art, each wheel is mounted on a spindle, and each spindle can be independently adjusted in a vertical direction, in a horizontal direction and at an angle relative the edge of the workpiece being worked. As is known in the art, the wheels mounted on the spindles can be peripheral wheels, which are recommended if a pencil edge or other shape is to be produced; or cup wheels can be used, which are recommended if a flat edge, miter or bevel is to be produced.

Figure 4:
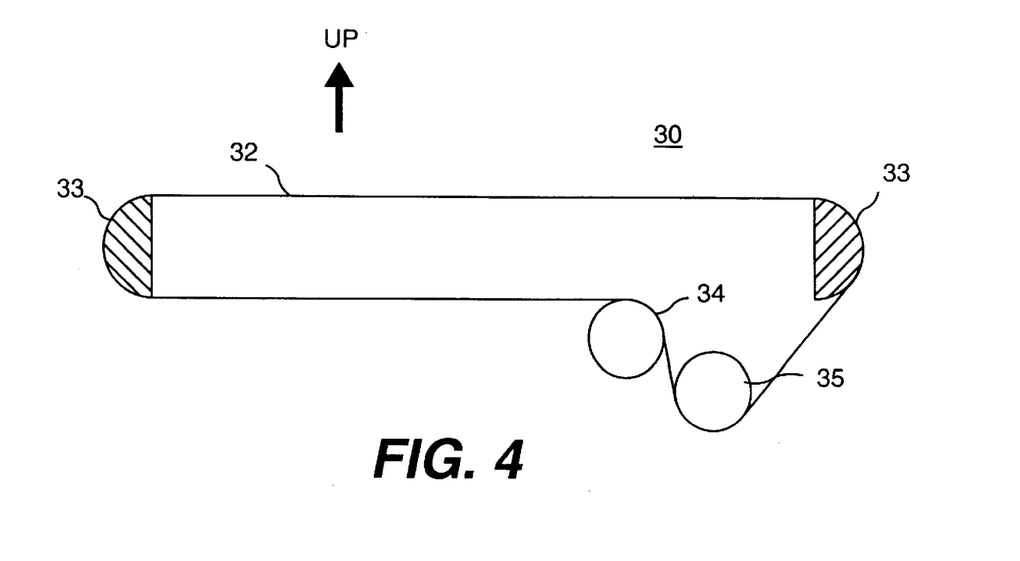
FIG. 4 provides an elevation view of a preferred embodiment of the infeed conveyor section of the edge-finishing machine of the present invention.

The edge-finishing machine of the present invention may also comprise an infeed conveyor section adjacent to the main conveyor section, for feeding a workpiece to the main conveyor section. FIG. 4 depicts a preferred embodiment of an infeed conveyor section 30 of the edge-finishing machine of the present invention, comprising a toothed infeed belt 32, means for driving the infeed belt, means for adjusting the speed of the infeed belt 32 relative to the speed of the main conveyor belts 11 and 12, and infeed belt tensioning means. In a preferred embodiment, infeed belt 32 is an endless conveyor belt. Infeed belt 32 is preferably made from a material similar to the material from which main conveyor belt 11 or 12 is made. Accordingly, in a preferred embodiment, infeed belt 32 is made from a durable elastomeric material, and may be reinforced with metal wires or other materials for long wear, high strength and reduced stretching.

In the preferred embodiment depicted in FIG. 4, the means for driving toothed infeed belt 32 is toothed pulley 35. In a preferred embodiment, toothed infeed pulley 35 is itself driven by its own power transmission unit (not shown). This unit preferably is electronicallylinked to the driving means of main conveyor belts 11 and 12, so that the speeds of the motor and the driving means of main conveyor belts 11 and 12 can be electronically synchronized or adjusted relative to each other. In a preferred embodiment of the invention, the infeed belt driving means includes an alternating current inverter to achieve this synchronization or adjustment. Mechanically adjusted speed variators may also be used to effectuate this synchronization or adjustment. Other techniques for achieving linkage between the speeds of main conveyor belts 11 and 12 and infeed belt 32 are apparent to those of skill in the art.

The infeed conveyor section 30 also includes means for adjusting the speed of infeed conveyor belt 32 relative to the speed of main conveyor belts 11 and 12. In a preferred embodiment, this speed adjusting means includes means, as are known to those of skill in the art, for maintaining the relative speeds of the infeed conveyor belt 32 and the main conveyor belts 11 and 12 as the speed of the main conveyor belts 11 and 12 or of the infeed conveyor belt 32 is adjusted. For example, in a preferred embodiment, if the speed of the infeed conveyor belt 32 was set at 98% of the speed the main conveyor belts 11 and 12, that ratio would be substantially maintained as the speed of the main conveyor belts 11 and 12 is increased or decreased. This prevents multiple workpieces from contacting each other while being conveyed through the edge-finishing machine.

Infeed conveyor section 30 also includes infeed belt tensioning means. In a preferred embodiment depicted in FIG. 4, the infeed belt tensioning means comprise non-rotating returns 33 and take-up pulley 34. In a preferred embodiment, returns 33 are made from the same types of materials as non-rotating returns 15 and 16 in main conveyor section 10 of the edge-finishing machine. In a preferred embodiment, the distance between returns 33 is not adjustable. In a preferred embodiment, take-up pulley 34 provides tension for infeed belt 32 and comprises a smooth pulley that contacts the back of infeed belt 32. Infeed belt tensioning means are aligned and arranged to provide proper tension to the infeed belt 32, as is apparent to those of skill in the art. Other means for tensioning infeed belt 32, including for example by use of mechanically adjusted springs or pulleys, will be apparent to those of skill in the art.

The edge-finishing machine of the present invention may also comprise an outfeed conveyor section adjacent to the main conveyor section, for feeding a workpiece from the main conveyor section, and located on the opposite side of the main conveyor section from the infeed conveyor section. In a preferred embodiment, the outfeed conveyor section is constructed substantially similarly, and works in generally the same way, as the infeed conveyor section.

The outfeed conveyor section of the edge-finishing machine of the present invention comprises a toothed outfeed conveyor belt, means for driving the outfeed conveyor belt, means for adjusting the speed of the outfeed conveyor belt relative to the speed of the main conveyor belts 11 and 12, and outfeed belt tensioning means. In a preferred embodiment, the toothed outfeed belt is an endless conveyor belt, preferably made from a material similar to the material from which the toothed infeed belt is made. Accordingly, in a preferred embodiment, the toothed outfeed belt is made from a durable elastomeric material, and may be reinforced with metal wires or other materials for long wear, high strength and reduced stretching.

The means for driving the toothed outfeed belt may be similar to the means for driving the toothed infeed belt, as described above and as apparent to those of skill in the art. In a preferred embodiment, means for driving the toothed outfeed belt comprise a power transmission unit, preferably electronically linked to the driving means of main conveyor belts 11 and 12, so that the speeds of the motor and the driving means of main conveyor belts 11 and 12 can be electronically synchronized or adjusted relative to each other. In a preferred embodiment of the invention, the infeed belt driving means includes an alternating current inverter to achieve this synchronization or adjustment. Mechanically adjusted speed variators may also be used to effectuate this synchronization or adjustment. Other techniques for achieving this linkage between the speeds of main conveyor belts 11 and 12 and toothed outfeed belt are apparent to those of skill in the art.

The outfeed conveyor section also includes means for adjusting the speed of the outfeed conveyor belt relative to the speed of main conveyor belts 11 and 12. In a preferred embodiment, this speed adjusting means includes means, as are known to those of skill in the art, for maintaining the relative speeds of the outfeed conveyor belt 32 and the main conveyor belts 11 and 12 as the speed of the main conveyor belts 11 and 12 or of the outfeed conveyor belt is adjusted. For example, in a preferred embodiment, if the speed of the outfeed conveyor belt 32 was set at 102% of the speed the main conveyor belts 11 and 12, that ratio would be substantially maintained as the speed of the main conveyor belts 11 and 12 is increased or decreased. This prevents multiple workpieces from contacting each other while being conveyed through the edge-finishing machine.

The outfeed conveyor section of the present invention also includes outfeed belt tensioning means. This outfeed belt tensioning means may comprise elements and techniques similar to those described above with respect to the infeed belt tensioning means, and as apparent to those of skill in the art.

In a preferred embodiment, the direction in which the workpiece is conveyed can be reversed, as would preferred in order to set up or adjust the edge-finishing means and other machine components. During such reverse-direction operations, actual edge finishing of a workpiece typically would not be undertaken.

In a preferred embodiment of the edge-finishing means of the present invention, the infeed and outfeed sections are interchangeable, as each section, including the main conveyor section, can be run in either direction for edge-finishing operations. In a preferred embodiment, to reverse the direction of the main conveyor section for edge-finishing operations, the positions of toothed pulley 13 and return 15 would be interchanged, and the positions of toothed pulley 14 and return 16 would be interchanged.

The present invention teaches that no idler pulleys are needed at the ends of the runs of the infeed and outfeed belts, providing an important benefit over currently used edge-finishing machines. In a preferred embodiment, the pulleys normally used in the prior art have been replaced by returns 33 made of ultra-high molecular weight plastic. The belts simply slide around these returns 33, eliminating further points of wear and possible failure.

Therefore, in a preferred embodiment of the infeed conveyor section 30 of the present invention depicted in FIG. 4, the only moving parts of the infeed section are the belt 32, which slides in and on supporting pieces of ultra high molecular weight plastic, the toothed pulley 35 (driven by the AC inverted motor) and idler pulley 34 to properly tension the belt 32. A similar reduction in moving parts is accomplished in the outfeed conveyor section.

For the edge finishing means—preferably comprising grinding or polishing wheels—to perform properly, and to yield long life, they must be supplied with an effective and continuous supply of cooling fluid. Accordingly, the edge-finishing machine of the present invention also may include cooling means. In a preferred embodiment depicted in FIG. 5, the cooling means comprises a coolant manifold pipe 45 and at least one nozzle 47 for directing coolant at the edge finishing means.

In a preferred embodiment depicted in FIG. 5, the coolant is distributed by the cooling means in a space 50 bounded on top by a lower plate 41 of the main conveyor section, on the bottom by a plate 42 of the base of the edge-finishing machine and on the right and left by the boundaries, respectively, between the infeed section and the main conveyor section, and the outfeed section and the main conveyor body. In a preferred embodiment, the front and rear of space 50 is generally defined by clear plastic cover 43, suspended from the lower plate 41 of the main conveyor section, which allows a generally unobstructed view of the space 50. Other materials may be used instead of clear plastic in order both to contain coolant inside the space 50 and to facilitate viewing the edge-finishing means and other components that may be located within the space 50.

In a preferred embodiment depicted in FIG. 5, the edge finishing means of the invention is located within the space 50. In a preferred embodiment depicted in FIG. 5, the edge finishing means comprise a line of grinding or polishing wheels 51. As depicted is FIG. 5, above this line of wheels is a coolant manifold pipe 45 held in position by at least one bracket. Mounted on coolant manifold pipe 45 are flexible tubes 46 ending in nozzles 47, with each nozzle 47 directing coolant at a grinding wheel 51. In a preferred embodiment depicted in FIG. 5, manifold pipe 45 is connected to coolant storage tank 44, which is supplied with water or other coolant by a pump (not shown) immersed in the coolant storage tank. Each nozzle 47 preferably can be individually directed for maximum effectiveness to the proper grinding or polishing wheel, or to the workpiece as it is conveyed past a wheel, by adjusting the flexible tubing 46.

In a preferred embodiment, after the coolant has been directed at the grinding wheels 51 or the workpiece 5, or both, coolant is free to fall to the bottom of the coolant space, from where it preferably drains to the rear of the edge-finishing machine into a collection container (not shown). The coolant preferably is then pumped from this container to the coolant storage tank 44. In a preferred embodiment, the entire coolant manifold pipe 45 with attached flexible tubes 46 and nozzles 47 is held by only two quickly released fittings so that the whole of the coolant system can be quickly removed for inspection and cleaning.

It will be apparent to those in the art that various modifications may be made to this invention and that other embodiments and equivalents of the invention may be made based on this disclosure. To the extent that such other embodiments or equivalents are created, it is intended that they shall fall within the protection provided by the appended claims and their equivalents.

What is claimed is:

1. An edge finishing machine, comprising:
    a main conveyer section, comprising
        a first main belt, a second main belt, a first toothed pulley, and a second toothed pulley
        said first and second main belts being, synchronously driven by said first toothed pulley driving said first main belt and said second toothed pulley driving said second main belt, each of said first and second main belts positioned for cooperatively engaging a workpiece such that the workpiece is cooperatively held in place between said first and second main belts, and wherein each of said first and second toothed pulley is driven by a separate power transmission, and
    means for tensioning each main belt; and
    means for edge finishing.

2. A machine as in claim 1, wherein the main belt tensioning means comprises a non-rotating return.

3. A machine as in claim 2, wherein the return is formed from ultra-high molecular weight plastic, acetyl, nylon, PTFE, or any other durable, low friction material.

4. A machine as in claim 1, wherein each of the main belts is an endless belt.

5. A machine as in claim 1, wherein each of the main belts is an endless elastomeric belt.

6. A machine as in claim 1, wherein each of the main belts is guided by a main belt track.

7. A machine as in claim 1, wherein the power transmission units are electronically connected to each other to provide synchronization.

8. A machine as in claim 7, wherein the power transmission units are connected to each other using an alternating current inverter.

9. A machine as in claim 1, wherein one of the power transmission units is a direct current drive.

10. A machine as in claim 1, wherein one of the power transmission units is a stepping motor.

11. A machine as in claim 1, further comprising
an infeed conveyor section, for feeding a workpiece to the main conveyor section, comprising
a toothed infeed belt,
means for driving the infeed belt,
means for adjusting the speed of the infeed belt relative to the speed of the main conveyor belts, and
means for tensioning the infeed belt.

12. A machine as in claim 11, wherein the means for driving the infeed belt comprises an alternating current inverter.

13. A machine as in claim 11, wherein the infeed belt comprises an endless belt.

14. A machine as in claim 13, wherein the infeed belt comprises an endless elastomeric belt.

15. A machine as in claim 1, further comprising
an outfeed conveyor section, for feeding a workpiece from the main conveyor section, comprising
a toothed outfeed belt,
means for driving the outfeed belt,
means for adjusting the speed of the outfeed belt relative to the speed of the main conveyor belts, and
means for tensioning the outfeed belt.

16. A machine as in claim 15, wherein the means for driving the outfeed belt comprises an alternating current inverter.

17. A machine as in claim 16, wherein the outfeed belt is an endless belt.

18. A machine as in claim 17, wherein the outfeed belt is an endless elastomeric belt.

19. A machine as in claim 1, further comprising means for directing coolant at the edge finishing means.

20. A machine as in claim 19, wherein the means for directing coolant comprises:
a coolant manifold pipe; and
at least one nozzle for directing coolant connected to the pipe.

21. A machine as in claim 20, further comprising at least one flexible tube, each flexible tube connecting at least one nozzle to the coolant manifold pipe.

* * * * *